March 23, 1971     G. M. BANKS     3,572,155
INTERLOCK MECHANISM
Filed June 30, 1969     2 Sheets-Sheet 1
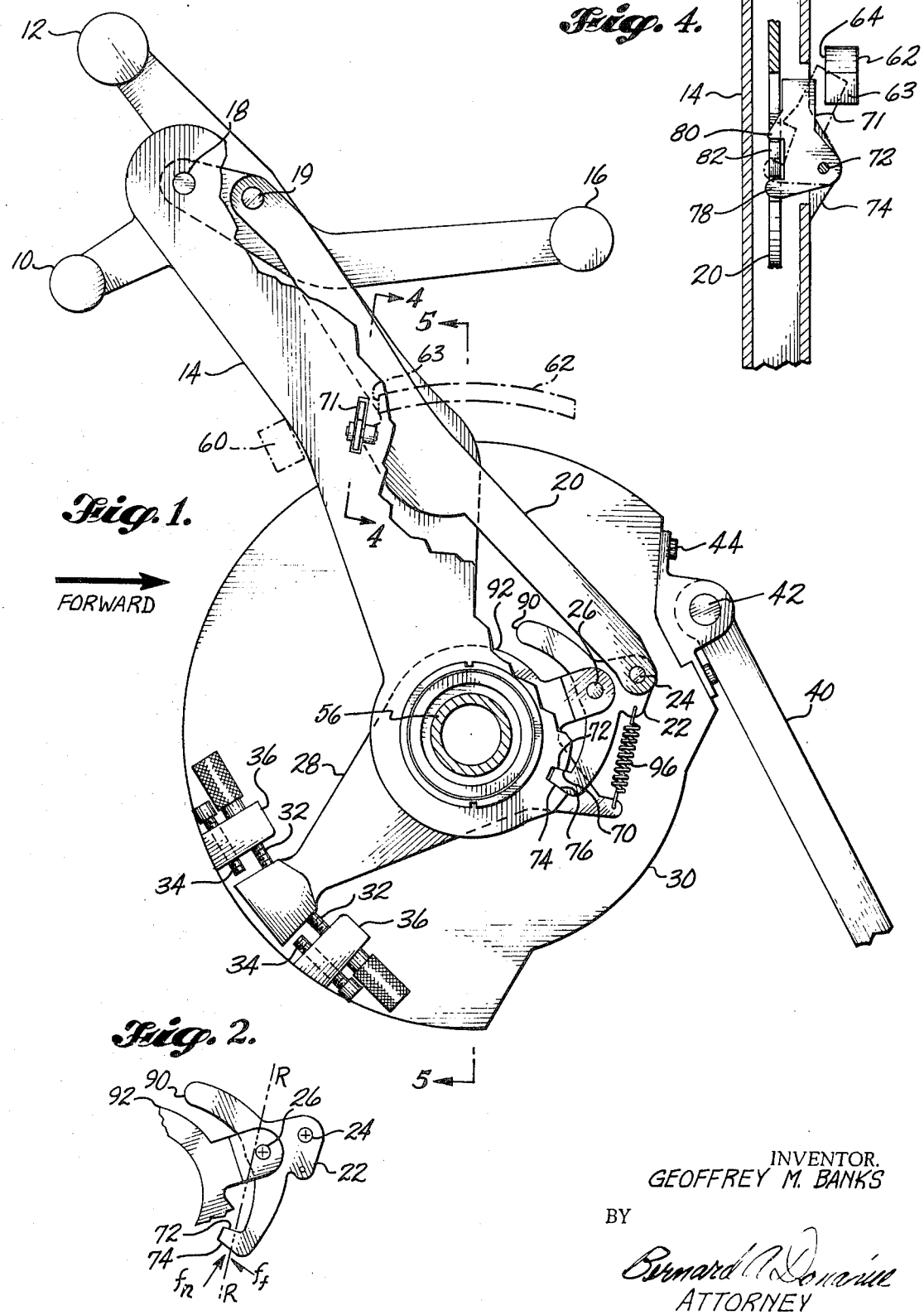
INVENTOR.
GEOFFREY M. BANKS
BY
*Bernard A. Domaine*
ATTORNEY

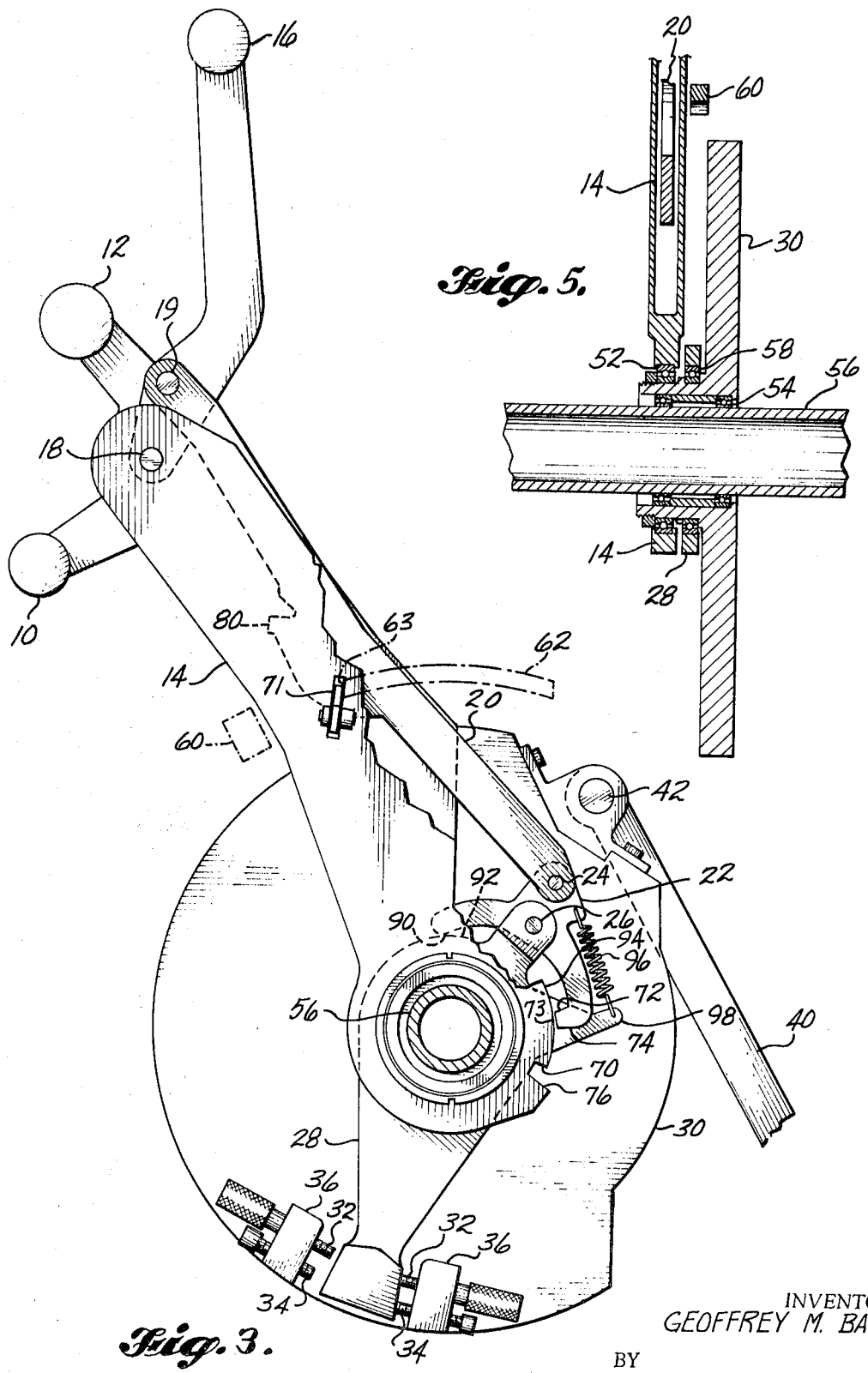

United States Patent Office 3,572,155
Patented Mar. 23, 1971

3,572,155
INTERLOCK MECHANISM
Geoffrey M. Banks, Bellevue, Wash., assignor to The Boeing Company, Seatttle, Wash.
Filed June 30, 1969, Ser. No. 837,535
Int. Cl. G05g 11/00
U.S. Cl. 74—479
2 Claims

ABSTRACT OF THE DISCLOSURE

A control system for interlocking either of two input levers to an output member. The preferred embodiment involves an aircraft pilot's forward and reverse thrust throttle control levers wherein the reverse thrust lever is pivotally carried by the forward thrust lever. A rotatable pawl member is used to drivingly interconnect the output member with the forward thrust lever in a first rotatable position, and to drivingly interconnect the reverse thrust lever with the output member when the pawl member is in a second position. Positioning of the pawl member is accomplished by movement of the reverse thrust lever. The interconnect pawl is self-locking for load transfer in either direction during forward thrust operation.

---

This invention relates to airplane control systems for pilot control of forward and reverse engine thrust, and, more particularly, to an improved pilot's throttle control mechanism for interlocking the forward and reverse thrust throttle control levers.

In modern multi-engine jet aircraft, the pilot's throttle control console includes individual levers for forward thrust control and for reverse thrust control of each engine. In certain installations it has been customary to pivotally mount the reverse thrust lever on the forward thrust lever such that the reverse thrust lever is carried in piggy-back fashion in a generally horizontal attitude on the forward side of the forward thrust lever, which is generally vertically disposed. In such installations it is essential that an interlock be provided to prevent inadvertent movement of the reverse thrust lever during forward thrust operation, while providing means to obtain reverser operation and reverse throttle control when the pilot applies a positive force to rotate the reverse thrust lever.

Certain designs considered for use in these installations have included over-center mechanisms in which the reverse lever will remain locked to the forward thrust lever until the pilot has moved the reverse lever a sufficient distance to pass over the center position. The disadvantages in such systems include a relatively large travel required to move the lever to an operative position, and very poor initial response per degree of lever rotation immediately thereafter. Persons skilled in the field of aircraft control and safety are well aware of the desirability of attaining instantaneous and positive response characteristics for thrust reverser actuation and reverse throttle control since a relay time of less than one second can mean a runway overtravel in excess of 100 feet.

It is an object of this invention to provide, in a control system having a first input member which rotatably carries a second input member, an interlock mechanism which is effective to prevent inadvertent relative movement of the second member while the first member is in motion or driving an output member.

It is a further object of this invention to provide an improved interlock mechanism which is effective to cause an output member to be selectively driven by either a first input member or a second input member, motion of the first input member being restricted while the second input member is driving the output.

A related objective is to provide, in an aircraft throttle control mechanism in which the reverse throttle control lever is carried by the forward thrust lever, an improved interlock mechanism which is self-locking during forward thrust operation, thereby preventing inadvertent movement of the reverse thrust lever by vibration or control feedback forces.

A further related objective is to provide an improved interlock mechanism of the type described which can be actuated to initiate reverse thrust operation by a relatively minor positive movement of the reverse thrust lever, and in which the system geometry can be readily tailored to give a desired mechanical advantage for actuation, and a preferred range of lever travel for throttle control sensitivity.

The above objectives are achieved in this invention by the provision of a pawl and a detent means which interconnect the first input member (forward thrust lever) with the second input member (reverse thrust lever) and the output member (engine throttle control), which can be actuated by a relatively short movement of the second input member to release the engagement of the first input member with the output member, and to interconnect and drive the output member directly with movement of the second input member.

BRIEF DESCRIPTION OF THE DRAWINGS

FIG. 1 shows a throttle control mechanism in the forward thrust mode of operation at the idle position.

FIG. 2 is an isolated view of the interlock pawl, schematically depicting the transfer of forces acting on the pawl during operation of the forward thrust lever.

FIG. 3 shows the mechanism of FIG. 1 positioned for full reverse thrust operation.

FIG. 4 is a cross-section taken at 4—4 in FIG. 1 showing the details of the forward thrust lever locking mechanism.

FIG. 5 is a cross-section taken at 5—5 in FIG. 1.

DESCRIPTION OF THE PREFERRED EMBODIMENT

Referring now to FIG. 1, the pilot's forward thrust handles 10 and 12 are rigidly connected to a forward thrust lever 14. A reverse thrust control handle 16 is pivotally mounted at 18 and interconnected at 19 to one end of link 20. The other end of link 20 is attached to a latch pawl member 22 at point 24. The latch pawl member 22 is rotatably mounted at 26 on the output arm 28 which is positioned to drive output disc 30 through a spring biased centering capsule 32 and the set screws 34. Capsule 32 and screws 34 are threadedly connected to flange 36 of the output disc 30. An output push-pull link 40 is pivotally mounted at 42 to a bracket 44 affixed to output disc 30. Engine throttle control is achieved by the attachment of output link 40 to means such as a cable quadrant and cable system (not shown) which is operably connected with a throttle control at the engine.

As is best seen in the cross-section view of FIG. 5, the forward thrust input lever 14 is rotatably mounted at 52 upon output disc 30 which is itself rotatably mounted at 54 upon cross-shaft 56. The output arm 28 is similarly rotatably mounted at 58 upon output disc 30. Therefore, the input lever 14 and the output arm 28 are free to rotate independently of each other unless an interconnection is made by other means.

Referring back to FIG. 1, the mechanism shown is positioned for forward thrust operation, with the forward thrust lever 14 in the idle position, against idle stop 60 which is affixed to console structure (not shown). To increase the engine throttle setting, the pilot can grasp either handle 10 or 12 and move the lever 14 forward, or clockwise, as shown. The clockwise force would be transmitted through lever 14 to its detent surface 70, onto surface 72 of latch pawl member 22, and into the output arm 28 at the pivot 26 of pawl member 22. The arm 28 then moves in a clockwise direction against centering spring 32 and set screw 34 to move the output disc 30 and the output rod 40 in a clockwise direction. In a similar manner, when it is desired to reduce the throttle setting in the forward thrust mode the pilot can move the lever 14 (by means of either handle 10 or 12) in a counterclockwise direction. Such motion is transferred from lever 14 through detent surface 76 onto pawl surface 74 and into the output lever 28 at pivot point 26, thereby causing counterclockwise movement of output disc 30 and the output link 40.

It is to be noted that the pawl detent load transfer disclosed here is accomplished in a manner which is self-locking as regards the retention of the pawl surfaces 72, 74 within the detent 70, 76. As can best be seen in the FIG. 2 isolated view, when the latch pawl member 22 is acting to transfer a counterclockwise force from the lever 14 (reduction of forward thrust), the pawl surface will be acted upon by a normal force $f_n$, and any tendency of the pawl to rotate out of the detent will be resisted by a friction force $f_f$. As will be readily understood by persons skilled in this art, the force $f_f$ is a product of the normal force $f_n$ and the static coefficient of friction $C_f$ acting between the material of pawl surface 74 and the detent surface 76. The resultant force acting upon the latch pawl 22 along line R—R will be the vector sum of the normal force $f_n$ and the friction force $f_f$. It is apparent that through routine selection of materials and geometry the force line R—R can be forced to fall to the left of the center of the latch pawl pivot point 26. This will establish a clockwise moment on latch pawl 22 which tends to retain the pawl in the detent under transfer of forces and loads.

It will likewise be readily understood that the inner pawl surface 72 is shaped and arranged as shown so that for load transfer in the opposite direction (forward movement of lever 14), the vector sum of the oppositely directed normal and friction forces can be forced to fall along a line to the right of the center of pivot point 26 thereby similarly creating a clockwise moment tending to retain the pawl surfaces 72, 74 in detent surfaces 70, 76.

It is to be noted that pawl 22 is self-locking not only for direct load transfer when the lever 14 is moved, but is also self-locking under the action of engine control feedback forces and the flight vibration environment, which are, of course, important parameters to be considered in aircraft interlock systems.

A further feature of the control system disclosed, relates to a lock-stop means which serves to prevent reverser actuation until the forward thrust lever 14 is moved to an idle setting, and also serves to hold the forward thrust lever 14 in an idle position during the reverse thrust mode. This feature is best understood by reference to FIG. 4 which is a cross-section taken through lines 4—4 of FIG. 1.

FIG. 4 shows a lever lock 71 pivotally mounted about point 72 on a flange 74 at the forward thrust lever 14. The lever lock 71 is arranged and disposed to preclude inadvertent movement of link 20 and reverser lever 16, at a forward thrust setting above the idle range. The lever lock 71 includes lug portions 78 and 80 which, in the forward thrust mode, surround lug portion 82 of the reverser link 20. The relative location and geometry of the lock-stop 62 with end face 63 and sideface 64 will prevent the lever-lock 71 from rotating into a position to release lug 82 of link 20 during higher level forward thrust throttle settings. Therefore, until the forward thrust lever 14 is moved to an idle setting, it is not possible to move the lever 16 to its reverse thrust position.

When the forward thrust lever 14 is moved to the idle setting in preparation for movement of thrust reverser lever 16 into its reverse thrust positions, an upward movement of lever 16 will cause movement of link 20, thereby rotating the lever lock 71 into the dotted line position of FIG. 4. In the idle setting of the forward thrust lever 14 shown in FIG. 1, the lever lock 71 is free to rotate past the lock-stop 62, thereby allowing link 20 and reverse thrust lever 16 to be moved upwardly in a direction corresponding to the reverse thrust mode shown in FIG. 3 of the drawings.

Referring now to FIG. 3, the reverse thrust lever 16 is shown to have been moved upwardly into the full reverse thrust position. The lever 16 can be seen to have been rotated about point 18 on forward thrust lever 14, to apply force to link 20 through the pivotable connection at 19. The link 20 through its connection at point 24 has applied a counterclockwise moment to the latch pawl 22, thereby removing pawl surfaces 72, 74 from the detent surfaces 70, 76, and causing an upper bearing lug portion 90 of latch pawl 22 to bear against a corresponding bearing surface 92 of the output arm 28, thereby causing the output arm 28 to be driven by the linkage system 16, 20, 22, from the reverse thrust idle position to the full reverse thrust throttle setting shown.

A retainer spring 96 is interconnected between latch pawl 22 and a lug 98 of the output arm 28, to provide a means to prevent rattling under the flight vibration environment. It will also be noted that the spring 96 tends to assist in the retention of pawl 72, 74 in the detent surfaces 70, 76 during forward thrust operation. However, as has been discussed previously, the force balance acting on the unique latch pawl arrangement of this invention makes this spring unnecessary for retention in the forward thrust mode.

It should be noted that during reverser operation when the lever 16 is moved counterclockwise (increase reverse thrust), the end surface 73 of pawl member 22 will be spaced from the input lever surface 94, while surfaces 90 and 92 are in contact. During reverser operation, when the lever 16 is moved clockwise and downwardly from the 100% reverse thrust position, forces will be fed into link 20 and pawl 22 to rotate the pawl in a clockwise direction so as to lift the contact of surfaces 90, 92 and to bring the pawl end surface 73 into sliding engagement with the input lever surface 94, thereby creating forces at the pivot point 26 acting to rotate the output lever 28 in a clockwise direction.

In operation, when reverse thrust is initiated by movement of the lever 16, with the lever 14 in the position shown in FIG. 1, the lever lock 71 is positioned aft of, and therefore free of, the lock-stop member 62. Continued upward movement of the reverse thrust lever 16 toward the position shown in FIG. 3 will put counterclockwise torque into the disc 30 for movement of output link 40 in an upward direction. Reaction forces will cause the lever 14 to rotate in a clockwise direction from its position against idle stop 60 shown in FIG. 1 to the FIG. 3 position wherein the lever-lock 71 moves into abutting contact with the end surface 63 of the lock-stop 62, and further clockwise movement of forward thrust lever 14 is prevented. Therefore, during reverse thrust operation, movement of the forward thrust lever is restricted to a narrow range coresponding to its idle settings.

It will be apparent to persons skilled in this art that the disclosed system is readily amenable to tailoring to provide virtually any desired combination of mechanical advantage and sensitivity for reverse thrust control purposes. The relative geometry of the lever 16, the pawl member 22, and pivot points 18, 19, 24 and 26 may be rearranged to provide a desired mechanical advantage for removal of the pawl member 22 from detent 70, 76, and for application of force through pawl member 22 to the output member 28. It is also to be noted that in contradistinction to many previous interlock designs, the interlock of this invention will not release under application of increased force to the primary input lever.

What is claimed is:

1. Apparatus of the class described which includes a first input member mounted for rotary movement about a first axis; an output member concentrically mounted with respect to said first axis; a second input member pivotally mounted on said first input member; means for optionally drivingly interconnecting either of said first or second input members to said output member comprising: pivotally mounted means carried by said output member, means for transferring forces between said first input member and said output member when said pivotally mounted means is in a first pivotal position and for transferring forces between said second input member and said output member when said pivotally mounted means is in a second pivotal position; and means for restricting movement of said first input member when said second input member is drivingly interconnected to said output member.

2. Apparatus according to claim 1 wherein said means for transferring forces between said first input member and said output member includes interengaging surfaces on said members which are disposed and arranged such that the resultant force created by the normal contact force and the friction force will cause a moment to act on said pivotally mounted means in a direction tending to maintain engagement of said interengaging surfaces.

References Cited

UNITED STATES PATENTS

| 2,778,241 | 1/1957 | Gaubtaz | 74—479 |
| 2,836,987 | 6/1958 | Gaubatz | 74—479 |

MILTON KAUFMAN, Primary Examiner